United States Patent [19]

Shyu

[11] Patent Number: 5,767,921
[45] Date of Patent: Jun. 16, 1998

[54] METHOD AND APPARATUS FOR GRADUALLY ADJUSTING COLOR COMPONENTS OF DIGITAL VIDEO DATA

[75] Inventor: Rong-Fuh Shyu, Hsinchu, Taiwan

[73] Assignee: Winbond Electronics Corp., Hsinchu, Taiwan

[21] Appl. No.: 642,195

[22] Filed: May 6, 1996

[51] Int. Cl.$^6$ ............................................. H04N 9/74
[52] U.S. Cl. ................................................ 348/578
[58] Field of Search ............................ 348/578, 599, 348/584, 590; H04N 9/74

[56] References Cited

U.S. PATENT DOCUMENTS

| | | | |
|---|---|---|---|
| 5,063,437 | 11/1991 | Owashi | 348/578 |
| 5,231,475 | 7/1993 | Ritter | 348/578 |
| 5,483,293 | 1/1996 | Okuhara | 348/578 |
| 5,638,133 | 6/1997 | Squier | 348/578 |

*Primary Examiner*—Howard Britton
*Attorney, Agent, or Firm*—Fish & Richardson P.C.

[57] ABSTRACT

A method for gradually adjusting intensity of a color component of pixels of successive images in a video data includes the steps of: a) providing an offset value; b) adding the offset value to the color component of each of the pixels of the successive images of the video data to generate an adjusted color component; c) setting a frequency factor indicative of times of adjustment of the offset value, the frequency factor corresponding to a number of the successive images per adjustment of the offset value; and d) adjusting the offset value in a predetermined manner in accordance with the frequency factor. An apparatus for gradually adjusting intensity of the color component is also disclosed.

25 Claims, 4 Drawing Sheets

METHOD AND APPARATUS FOR GRADUALLY ADJUSTING COLOR COMPONENTS OF DIGITAL VIDEO DATA

BACKGROUND OF THE INVENTION

1. Field of the Invention

The invention relates to a method and apparatus for digital video processing, more particularly to a method and apparatus for gradually adjusting color components of digital video data.

2. Description of the Related Art

Digital video processing techniques play a vital role in a multi-media era. The ability to provide high fidelity and a wide range of flexibility in perceiving visual effects is favorable in modern multimedia products. Digitized video data can facilitate a wide range of manipulation to produce many visual effects. In digital video data, colors usually consist of three components, such as R (red), G (green) and B (blue) in a natural (RGB) color space or Y, Cb, Cr components in a luminance-chrominance (YCbCr) color space, to represent the full range of colors. The color components can be processed to produce some special effects, such as changing the color intensity, altering the hue of a color, changing the degree of saturation of a color and changing the brightness of a color. Combining these effects can further produce a variety of macro visual effects, such as fading or the gradual degrading or enhancing of pixels of successive images of a video data along a time axis.

In a digital video data, each color component is usually represented in 8 bits, which can support a true color range for either computer display or television video scan. In a color component that represents color with intensity strength, such as R, G and B components in the natural color space and the Y component in the luminance-chrominance color space, the color component is usually coded in a monolistically increasing manner, i.e. from 0 to 255 in 8-bit representation with 0 representing the lowest intensity and 255 representing the strongest intensity. In a color component that represents the chrominance of color, such as Cb and Cr color components in the luminance-chrominance color space, the color component is coded in a notched manner, i.e. in an 8-bit representation, the central value of 128 represents the lowest chrominance quantity while the extreme values of 0 and 255 represent the strongest chrominance quantity of different chrominance coordinates, e.g. different hues of a color. A value that increases from 128 toward 255 means a stronger degree of color saturation along a set of hue while a value that decreases from 128 to 0 means a stronger degree of color saturation along a different set of hue. Therefore, data processing for achieving various visual effects between luminance component and chrominance components of a color that is represented in the YCbCr color space requires a somewhat different approach.

In adjusting the luminance component, the original value is modified so as to become an adjusted one that ranges from 0 to 255 in 8-bit representation. In adjusting the chrominance component, the adjusted value should lie within the same chrominance coordinate of the original value to prevent a tremendous change of hue unless it is intended to achieve such a great degree of hue adjustment. Thus, in a gradual adjustment of 8-bit chrominance components, the adjusted value should range from 128 to 255 if the original value lies within 128 to 255, and should range from 0 to 128 if the original value lies within 0 to 128.

SUMMARY OF THE INVENTION

The object of the present invention is to provide a method and apparatus for gradually achieving color adjustment of a luminance component so as to produce a special fading effect on the brightness of a color.

Another object of the present invention is to provide a method and apparatus for gradually achieving color adjustment of a chrominance component so as to produce a special fading effect on the degree of color saturation.

According to one aspect of the present invention, a method for gradually adjusting intensity of a color component of pixels of successive images in a video data comprises the steps of: a) providing an offset value; b) adding the offset value to the color component of each of the pixels of the successive images of the video data to generate an adjusted color component; c) setting a frequency factor indicative of times of adjustment of the offset value, the frequency factor corresponding to a number of the successive images per adjustment of the offset value; and d) adjusting the offset value in a predetermined manner in accordance with the frequency factor.

According to another aspect of the present invention, an apparatus for gradually adjusting intensity of a color component of pixels of successive images in a video data comprises: means for providing an offset value; means for adding the offset value to the color component of each of the pixels of the successive images of the video data to generate an adjusted color component; means for setting a frequency factor indicative of times of adjustment of the offset value, the frequency factor corresponding to a number of the successive images per adjustment of the offset value; and means for adjusting the offset value in a predetermined manner in accordance with the frequency factor.

Preferably, the offset value providing means includes an offset register. The adding means is connected electrically to the offset register so as to receive the offset value therefrom. The adding means adds the offset value to the color component of each of the pixels of the successive images of the video data to generate the adjusted color component. The adjusting means includes means for providing a step factor, and an adder connected electrically to the step factor providing means and to the offset register. The adder adds the step factor and the offset value from the offset register. The adjusting means further includes means for determining a sign of the step factor so that the offset value can be adjusted selectively in a first manner, wherein the offset value is increased by the step factor at each time of adjustment, and a second manner, wherein the offset value is decreased by the step factor at each time of adjustment. The setting means includes a register unit for storing the frequency factor therein, and a refresh counter which receives an external refresh clock and the frequency factor from the register unit. The refresh counter is connected electrically to the offset register and activates the offset register to store the output of the adder therein at each time of adjustment.

In one embodiment, the color component is coded as a digital representation of monolistically increasing manner such that a smallest code represents a minimum intensity and a largest code represents a maximum intensity. The apparatus further comprises means for determining a sign of the offset value so that the offset value has a positive sign when enhancing the color component of each of the pixels of the successive images of the video data and so that the offset value has a negative sign when degrading the color component of each of the pixels of the successive images of the video data.

In another embodiment, the color component is coded as a digital representation having a central value that represents a minimum intensity and upper and lower extreme values that represent maximum intensity of different chrominance coordinates. The apparatus further comprises means for determining whether the color component is greater than or less than the central value, and means for determining a sign of the offset value so that the offset value has a positive sign when the color component is less than the central value and so that the offset value has a negative sign when the color component is greater than the central value.

The two embodiments can be combined for application in the luminance-chrominance color space used in popular digital video data so as to achieve a wide range of color adjustment that is required in video processing technology. Nevertheless, a color represented in other color spaces, such as the RGB color space, can also be processed in accordance with the present invention to achieve the desired color adjustment.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
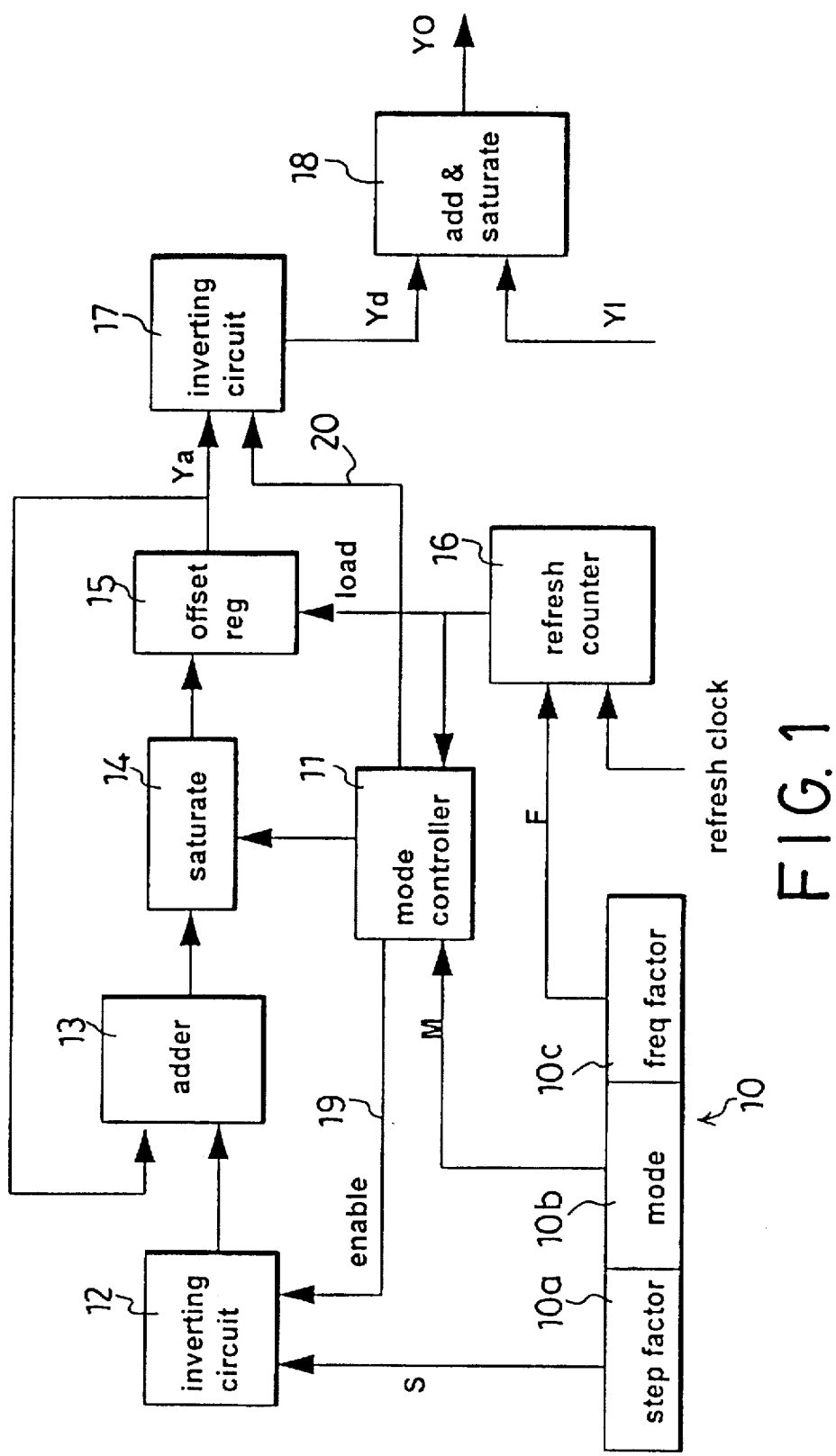
FIG. 1 is a schematic circuit block diagram of the first preferred embodiment of a gradual color adjustment apparatus according to the present invention.

As shown in FIG. 1, the first preferred embodiment of a gradual color adjustment apparatus according to the present invention can be used to process the Y color component in a luminance-chrominance or YCbCr color space or any of the R, G, B color components in a natural or RGB color space. In this embodiment, the Y color component is processed as an example to illustrate operation of the first preferred embodiment. Although the first preferred embodiment is shown as a block diagram of a dedicated hardware apparatus, it is also possible to implement the first preferred embodiment as a programmed computer as long as the computing power of the microprocessor used in the computer is powerful enough to achieve real time processing of live video data.

The first preferred embodiment, which can be used to achieve a fading effect on the Y color component of pixels of successive digital video images, comprises a register file 10, a mode controller 11, a first inverting circuit 12, an adder 13, a saturating circuit 14, an offset register 15, a refresh counter 16, a second inverting circuit 17, and an add-and-saturate circuit 18.

The register file 10 is used to specify fading control parameters and includes a first register 10a for specifying a step factor (S), a second register 10b for specifying an operating mode (M) and a third register 10c for specifying a frequency factor (F). The step factor (S) specifies an incremental/decremental value of an offset value (Ya) stored in the offset register 15 in each time of adjustment. The frequency factor (F) specifies how frequent adjustment of the offset value (Ya) should be performed. The first preferred embodiment can be operated in four modes, including a normal mode and three fading modes. The three fading modes are enhancement, degradation and recovery. The enhancement mode will gradually enhance the Y color component of the original pixels. The degradation mode will gradually degrade the Y color component of the original pixels. The normal mode will keep the Y color component of the original pixels unaltered. The recovery mode will degrade the Y color component of the original pixels inversely if the previous mode is enhancement, and will enhance the Y color component of the original pixels inversely if the previous mode is degradation. Thus, the possible modes of operation of the first preferred embodiment are: (1) enhance from current value to an upper extreme; (2) recover from enhancement to normal; (3) degrade the current value to a lower extreme; (4) recover from degradation to normal; and (5) abruptly force current value to normal. The register file 10 can be programmed externally, such as via a microprocessor (not shown), so as to set the step factor (S), the operating mode (M), and the frequency factor (F) at any time.

The mode controller 11 operates in accordance with the previous and current operating modes (M) set in the register file 10 and generates appropriate control signals which include an enable signal 19 for enabling the first inverting circuit 12 when the current operating mode is a recovery mode, several saturation control signals to the saturating circuit 14 for saturating the offset value (Ya) to 0 when the current operating mode is a normal mode and when the adjusted offset value (Ya) drops below 0 if the current operating mode is a recovery mode, and for saturating the offset value (Ya) to 255 when the adjusted offset value (Ya) exceeds 255 if the current operating mode is an enhancement or degradation mode, and another enable signal 20 for enabling the second inverting circuit 17 when the current operating mode is a degradation or recovery from degradation mode.

The first inverting circuit 12 receives the step factor (S) from the first register 10a and the enable signal 19 from the mode controller 11. The first inverting circuit 12 generates a complement of the step factor (S), i.e. a negative value of the step factor (S), when the enable signal 19 is present.

The output of the first inverting circuit 12 serves as one of the inputs of the adder 13. A previous offset value (Ya) from the offset register 15 serves as the other input of the adder 13.

The output of the adder 13 is connected to the saturating circuit 14. The saturating circuit 14 receives the control signals from the mode controller 11 so as to clip the output of the adder 13 to the largest value of 255 when the current operating mode is an enhancement or degradation mode, and so as to clip the output of the adder 13 to the smallest value of 0 when the current operating mode is a recovery or normal mode.

The offset register 15 stores the output of the saturating circuit 14 therein in accordance with a load command from the refresh counter 16, and provides the same as a new offset value (Ya) back to the adder 13 for a succeeding accumulation operation.

The refresh counter 16 receives the frequency factor (F) from the register file 10 and counts in a refresh clock to generate the load command to the offset register 15. The load command is generated per F refresh clocks counted. The refresh clock is practically at a video frame rate. Thus, the offset value (Ya) is adjusted every F number of successive video images. The load command is also received by the mode controller 11 to synchronize the enable signal 20.

The second inverting circuit 17 receives the offset value (Ya) from the offset register 15 and is controlled by the enable signal 20 from the mode controller 11 to generate a modifying Y value (Yd) to be added to the Y color component of the original pixels. When the current operating mode is a degradation or recovery from degradation mode, the enable signal 20 will activate the second inverting circuit 17 to output the complement of the offset value (Ya).

The add-and-saturate circuit 18 receives the modifying Y value (Yd) and the original Y value (YI) to obtain an adjusted Y value (YO).

Figure 2:
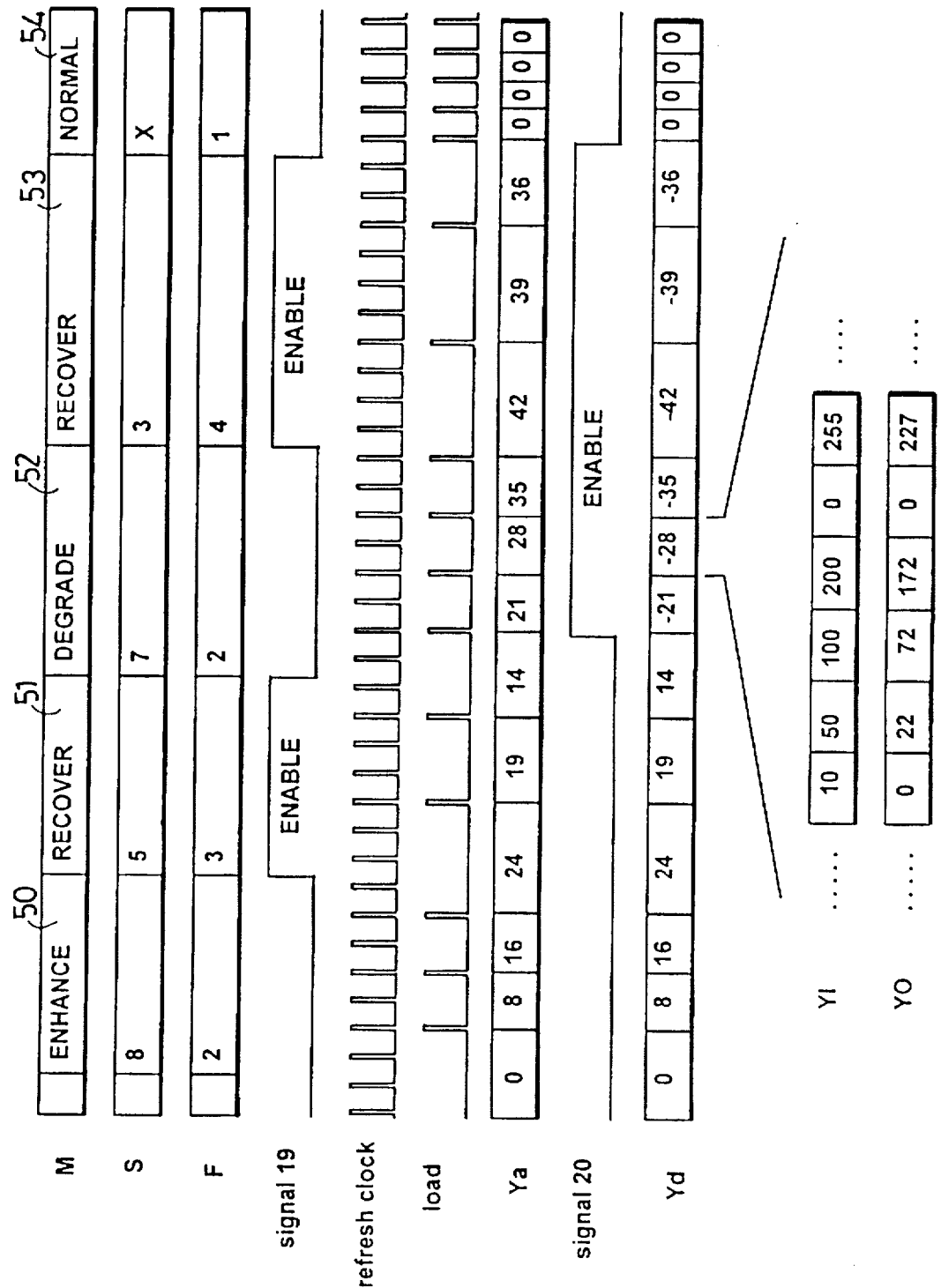
FIG. 2 is a timing diagram which illustrates the operation of the first preferred embodiment under different operating modes.

FIG. 2 is a timing diagram which illustrates operation of the first preferred embodiment. In this example, the enhancement, recovery, degradation, recovery and normal modes are performed in sequence. During the enhancement mode 50 with S=8 and F=2, the enable signal 19 is not generated to specify that an incremental step of 8 units per 2 refresh clock cycles is to be performed. Thus, the offset value (Ya) in the offset register 15 increases by 8 units per load command from the refresh counter 16. The enable signal 20 is not generated so that the modifying Y value (Yd) is equal to the offset value (Ya). During the following recovery mode 51 with S=5 and F=3, the enable signal 19 is generated to specify a decremental step of 5 units per 3 refresh clock cycles. Thus, the offset value (Ya) in the offset register 15 is decreased by 5 units per load command from the refresh counter 16. The enable signal 20 is still not generated so that the modifying Y value (Yd) is equal to the offset value (Ya). During the succeeding degradation mode 52 with S=7 and F=2, the enable signal 19 is not generated to specify an incremental step of 7 units per 2 refresh clock cycles. The offset value (Ya) in the offset register 15 is increased by 7 units per load command from the refresh counter 16. However, the enable signal 20 is generated so that the offset value (Ya) is complemented to obtain the modifying Y value (Yd). During the following recovery mode 53 with S=3 and F=4, the enable signal 19 is generated to specify a decremental step of 3 units per 4 refresh clock cycles. Thus, the offset value (Ya) in the offset register 15 is decreased by 3 units per load command from the refresh counter 16. The enable signal 20 is also generated since the current operating mode is a recovery from degradation such that the offset value (Ya) is complemented to obtain the modifying Y value (Yd). Finally, during the normal mode 54, the mode controller 11 activates the saturating circuit 14 to always clip the output of the adder 13 to 0. Thus, the offset value (Ya) is forced to 0, and the Y color component of the original pixels remains unaltered.

The bottom portion of FIG. 2 shows how the Y components (YI) of successive incoming original pixels are adjusted to obtain the adjusted Y component (YO). The values of the resulting adjusted Y components (YO) are clipped to between 0 and 255 by the add-and-saturate circuit 18.

Figure 3:
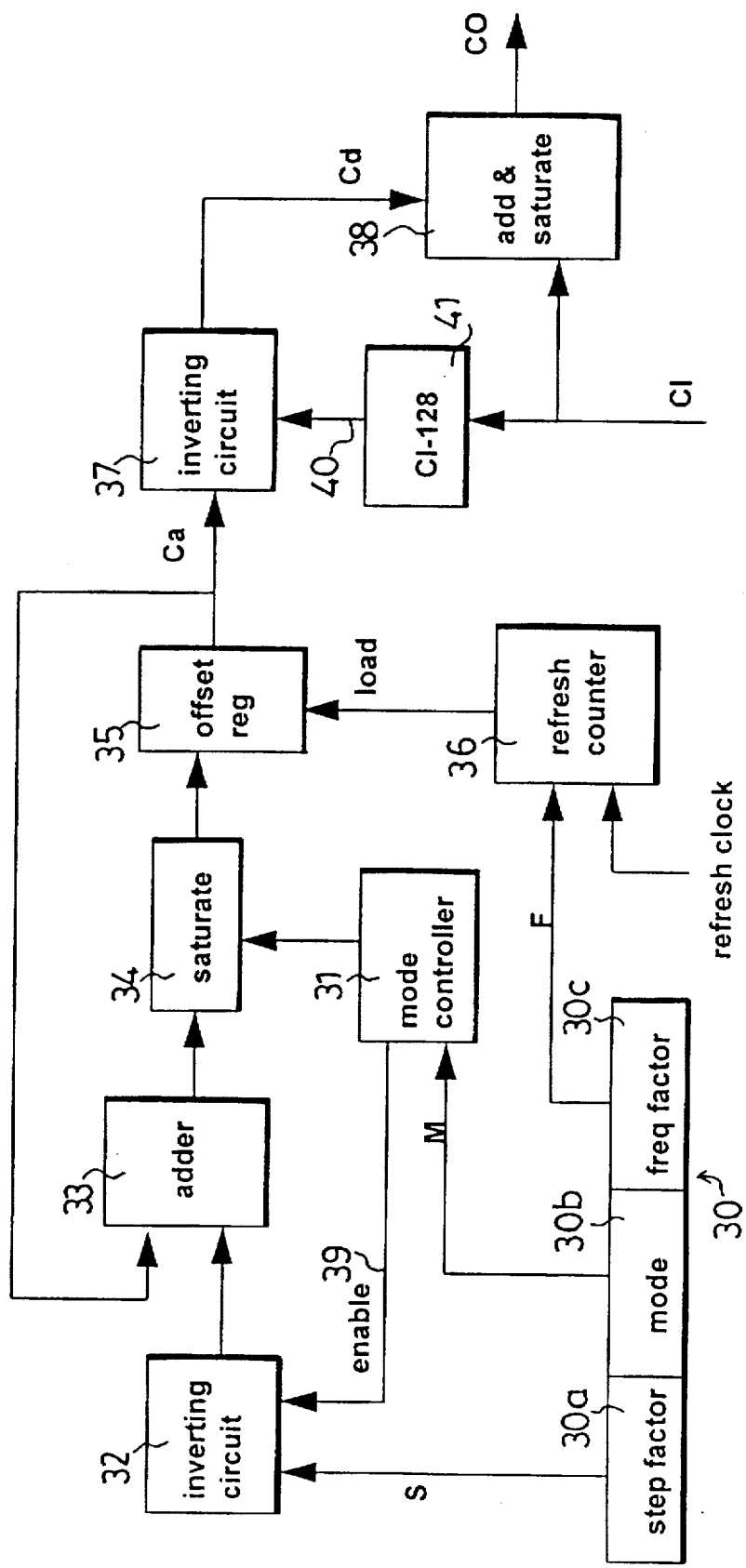
FIG. 3 is a schematic circuit block diagram of the second preferred embodiment of a gradual color adjustment apparatus according to the present invention.

Referring to FIG. 3, the second preferred embodiment of a gradual color adjustment apparatus according to the present invention is used to process a chrominance component, such as Cb, Cr color difference components, in a luminance-chrominance color space. The color component is coded in an 8-bit representation and ranges from 0 to 255, wherein 128 represents a colorless value while 0 and 255 represent the most intense chrominance values in the respective color hue. As with the previous embodiment, the second preferred embodiment is shown as a block diagram of a dedicated hardware, although the second preferred embodiment can also be implemented as a programmed computer as long as the computing power of the microprocessor used in the computer is powerful enough to achieve real time processing of live video data.

The second preferred embodiment is generally similar to the previous embodiment, the main difference residing in the control of the second inverting circuit 37. As shown in FIG. 3, the second preferred embodiment is used to achieve a fading effect on the chrominance component of pixels of successive digital video images and comprises a register file 30, a mode controller 31, a first inverting circuit 32, an adder 33, a saturating circuit 34, an offset register 35, a refresh counter 36, the second inverting circuit 37, an add-and-saturate circuit 38, and a computing circuit 41.

The register file 30 is used to specify fading control parameters and includes a first register 30a for specifying a step factor (S), a second register 30b for specifying an operating mode (M) and a third register 30c for specifying a frequency factor (F). The step factor (S) specifies an incremental/decremental value of an offset value (Ca) stored in the offset register 35 in each time of adjustment. The frequency factor (F) specifies how frequent adjustment of the offset value (Ca) should be performed. The second preferred embodiment can be operated in four modes, including a normal mode and three fading modes. The three fading modes are enhancement, degradation and recovery. The enhancement and degradation modes will gradually enhance the chrominance component of the original pixels to the colorless value of 128 when the original chrominance value is less than 128, and will gradually degrade the chrominance component of the original pixels to the colorless value when the original chrominance value is greater than 128. The normal mode will keep the chrominance color component of the original pixels unaltered. The recovery mode will degrade the chrominance color component of the original pixels inversely if the current original chrominance value is less than 128 and will enhance the chrominance color component inversely if the current original chrominance value is greater than 128. Thus, the possible modes of operation of the second preferred embodiment are: (1) enhance from current value to colorless value; (2) recover from enhancement to normal; (3) degrade the current value to colorless value; (4) recover from degradation to normal; and (5) abruptly force current value to normal. The register file 30 can be programmed externally, such as via a microprocessor (not shown), so as to set the step factor (S), the operating mode (M), and the frequency factor (F) at any time.

The mode controller 31 operates in accordance with the previous and current operating modes (M) set in the register file 30 and generates appropriate control signals which include an enable signal 39 for enabling the first inverting circuit 32 when the current operating mode is a recovery mode, and several saturation control signals to the saturating circuit 34 for saturating the offset value (Ca) to 0 when the current operating mode is a normal mode and when the offset value (Ca) drops below 0 if the current operating mode is a recovery mode, and for saturating the offset value (Ca) to 128 when the current operating mode is an enhancement or degradation mode.

The first inverting circuit 32 receives the step factor (S) from the first register 30a and the enable signal 39 from the mode controller 31. The first inverting circuit 32 generates a complement of the step factor (s) i.e. a negative value of the step factor (S), when the enable signal 39 is present.

The output of the first inverting circuit 32 serves as one of the inputs of the adder 33. A previous offset value (Ca) from the offset register 35 serves as the other input of the adder 33.

The output of the adder 33 is connected to the saturating circuit 34. The saturating circuit 34 receives the control signals from the mode controller 31 so as to clip the output of the adder 33 to a largest value of 128 when the current operating mode is an enhancement or degradation mode, and so as to clip the output of the adder 33 to a smallest value of 0 when the current operating mode is a recovery or normal mode.

The offset register 35 stores the output of the saturating circuit 34 therein in accordance with a load command from the refresh counter 36, and provides the same as a new offset value (Ca) back to the adder 33 for a succeeding accumulation operation.

The refresh counter 36 receives the frequency factor (F) from the register file 30 and counts in a refresh clock to generate the load command to the offset register 35. As with the previous embodiment, the load command is generated per F refresh clocks counted, and the refresh clock is practically at a video frame rate. Thus, the offset value (Ca) is adjusted every F number of successive video images.

The computing circuit 41 subtracts 128 from the current chrominance value (CI) and produces an enable signal 40 when the current chrominance value (CI) is greater than 128.

The second inverting circuit 37 receives the offset value (Ca) from the offset register 35 and is controlled by the enable signal 40 from the computing circuit 41 to generate a modifying value (Cd) to be added to the chrominance color component (CI) of the original pixels. When the enable signal 40 is present, the second inverting circuit 37 is activated so as to output the complement of the offset value (Ca).

The add-and-saturate circuit 38 receives the modifying value (Cd) and the original chrominance value (CI) to obtain an adjusted chrominance value (CO).

Figure 4:
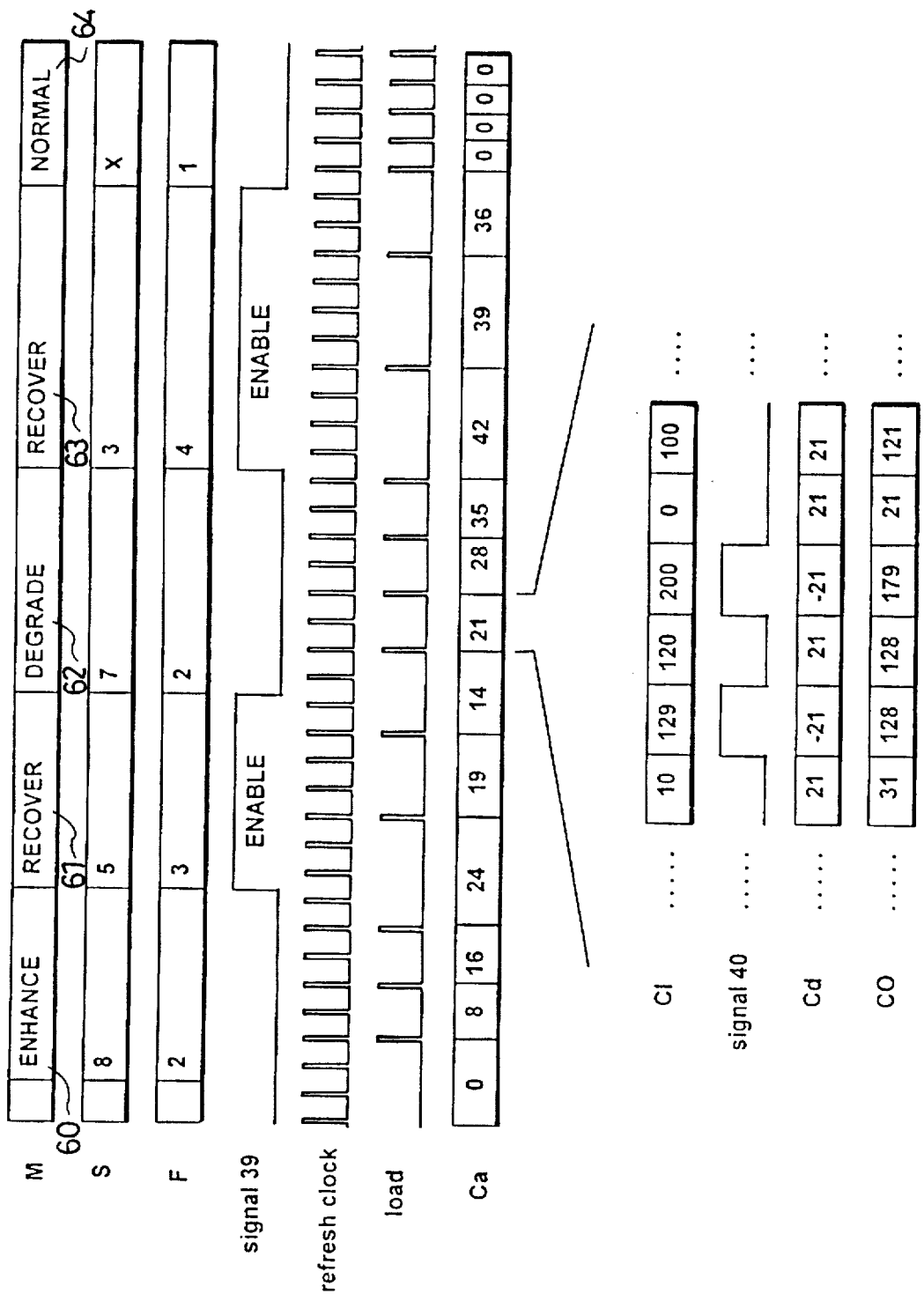
FIG. 4 is a timing diagram which illustrates the operation of the second preferred embodiment under different operating modes.

FIG. 4 is a timing diagram which illustrates operation of the second preferred embodiment. In this example, the enhancement, recovery, degradation, recovery and normal modes are performed in sequence. During the enhancement mode 60 with S=8 and F=2, the enable signal 39 is not generated to specify that an incremental step of 8 units per 2 refresh clock cycles is to be performed. Thus, the offset value (Ca) in the offset register 35 increases by 8 units per load command from the refresh counter 36. When the current chrominance value (CI) is greater than 128, the modifying value (Cd) is equal to the complement of the offset value (Ca). Otherwise, the modifying value (Cd) is equal to the offset value (Ca). During the following recovery mode 61 with S=5 and F=3, the enable signal 39 is generated to specify a decremental step of 5 units per 3 refresh clock cycles. Thus, the offset value (Ca) in the offset register 35 is decreased by 5 units per load command from the refresh counter 36. During the succeeding degradation mode 62 with S=7 and F=2, the enable signal 39 is not generated to specify an incremental step of 7 units per 2 refresh clock cycles. The offset value (Ca) in the offset register 35 is increased by 7 units per load command from the refresh counter 36. During the following recovery mode 63 with S=3 and F=4, the enable signal 39 is generated to specify a decremental step of 3 units per 4 refresh clock cycles. Thus, the offset value (Ca) in the offset register 35 is decreased by 3 units per load command from the refresh counter 36. Finally, during the normal mode 64, the mode controller 31 activates the saturating circuit 34 to always clip the output of the adder 33 to 0. Thus, the offset value (Ca) is forced to 0, and the chrominance color component (CI) of the original pixels remains unaltered.

In view of the foregoing, it can be seen that the second preferred embodiment operates in a manner similar to the previous embodiment. In this embodiment, however, the sign of the modifying value (Cd) is determined by the magnitude of the incoming chrominance component (CI). When the incoming chrominance component (CI) is greater than 128, the modifying value (Cd) is equal to the complement of the offset value (Ca). Otherwise, the modifying value (Cd) is kept equal to the offset value (Ca). The bottom portion of FIG. 4 shows how the chrominance components (CI) of successive incoming original pixels are adjusted to obtain the adjusted chrominance components (CO). The values of the resulting adjusted chrominance components (CO) are clipped to between 128 and either extreme value, 0 or 255, by the add-and-saturate circuit 38.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for gradually adjusting intensity of a color component of pixels of successive images in a video data, said method comprising the steps of:
   a) providing an offset value;
   b) adding the offset value to the color component of each of the pixels of the successive images of the video data to generate an adjusted color component;
   c) setting a frequency factor indicative of times of adjustment of the offset value, the frequency factor corresponding to a number of the successive images per adjustment of the offset value; and
   d) adjusting the offset value in a predetermined manner in accordance with the frequency factor.

2. The method as claimed in claim 1, wherein the color component is coded as a digital representation of monolistically increasing manner such that a smallest code represents a minimum intensity and a largest code represents a maximum intensity.

3. The method as claimed in claim 2, wherein the color component is selected from the group consisting of a Y color component in a luminance-chrominance color space and R, G and B color components in a natural color space.

4. The method as claimed in claim 2, further comprising the step of determining a sign of the offset value, the offset value having a positive sign when enhancing the color component of each of the pixels of the successive images of the video data, and having a negative sign when degrading the color component of each of the pixels of the successive images of the video data.

5. The method as claimed in claim 1, further comprising the step of providing a step factor, the offset value being selectively adjustable in a first manner, wherein the offset value is increased by the step factor at each time of adjustment, and a second manner, wherein the offset value is decreased by the step factor at each time of adjustment.

6. The method as claimed in claim 5, wherein the offset value is further adjustable selectively in a third manner in which the offset value is forced to 0.

7. The method as claimed in claim 1, further comprising the step of saturating the offset value to an extreme value when the offset value exceeds the extreme value.

8. The method as claimed in claim 1, wherein the color component is coded as a digital representation having a central value that represents a minimum intensity and upper and lower extreme values that represent maximum intensity of different chrominance coordinates.

9. The method as claimed in claim 8, wherein the color component is selected from the group consisting of Cb and Cr color components in a luminance-chrominance color space.

10. The method as claimed in claim 8, further comprising the step of determining a sign of the offset value, the offset value having a positive sign when the color component is less than the central value, and a negative sign when the color component is greater than the central value.

11. An apparatus for gradually adjusting intensity of a color component of pixels of successive images in a video data, said apparatus comprising:

means for providing an offset value;

means for adding the offset value to the color component of each of the pixels of the successive images of the video data to generate an adjusted color component;

means for setting a frequency factor indicative of times of adjustment of the offset value, the frequency factor corresponding to a number of the successive images per adjustment of the offset value; and means for adjusting the offset value in a predetermined manner in accordance with the frequency factor.

12. The apparatus as claimed in claim 11, wherein the color component is coded as a digital representation of monolistically increasing manner such that a smallest code represents a minimum intensity and a largest code represents a maximum intensity.

13. The apparatus as claimed in claim 12, wherein the color component is selected from the group consisting of a Y color component in a luminance-chrominance color space and R, G and B color components in a natural color space.

14. The apparatus as claimed in claim 12, further comprising means for determining a sign of the offset value so that the offset value has a positive sign when enhancing the color component of each of the pixels of the successive images of the video data and so that the offset value has a negative sign when degrading the color component of each of the pixels of the successive images of the video data.

15. The apparatus as claimed in claim 11, further comprising means for providing a step factor, said adjusting means being operable so as to adjust selectively the offset value in a first manner, wherein the offset value is increased by the step factor at each time of adjustment, and a second manner, wherein the offset value is decreased by the step factor at each time of adjustment.

16. The apparatus as claimed in claim 15, wherein said adjusting means is further operable so as to adjust selectively the offset value in a third manner in which the offset value is forced to 0.

17. The apparatus as claimed in claim 11, wherein said adjusting means saturates the offset value to an extreme value when the offset value exceeds the extreme value.

18. The apparatus as claimed in claim 11, wherein the color component is coded as a digital representation having a central value that represents a minimum intensity and upper and lower extreme values that represent maximum intensity of different chrominance coordinates.

19. The apparatus as claimed in claim 18, wherein the color component is selected from the group consisting of Cb and Cr color components in a luminance-chrominance color space.

20. The apparatus as claimed in claim 18, further comprising means for determining a sign of the offset value so that the offset value has a positive sign when the color component is less than the central value and so that the offset value has a negative sign when the color component is greater than the central value.

21. The apparatus as claimed in claim 11, wherein:

said offset value providing means includes an offset register, said adding means being connected electrically to said offset register so as to receive the offset value therefrom, said adding means adding the offset value to the color component of each of the pixels of the successive images of the video data to generate the adjusted color component;

said adjusting means includes means for providing a step factor, and an adder connected electrically to said step factor providing means and to said offset register, said adder adding the step factor and the offset value from said offset register, said adjusting means further including means for determining a sign of the step factor so that the offset value can be adjusted selectively in a first manner, wherein the offset value is increased by the step factor at each time of adjustment, and a second manner, wherein the offset value is decreased by the step factor at each time of adjustment; and said setting means includes a register unit for storing the frequency factor therein, and a refresh counter which receives an external refresh clock and the frequency factor from said register unit, said refresh counter being connected electrically to said offset register and activating said offset register to store output of said adder therein at each time of adjustment.

22. The apparatus as claimed in claim 21, wherein said adjusting means further includes a saturating circuit which interconnects said adder and said offset register and which is operable so as to adjust selectively the offset value in a third manner in which the offset value is forced to 0.

23. The apparatus as claimed in claim 22, wherein said saturating circuit saturates the offset value to an extreme value when the offset value exceeds the extreme value.

24. The apparatus as claimed in claim 21, wherein the color component is coded as a digital representation of monolistically increasing manner such that a smallest code represents a minimum intensity and a largest code represents a maximum intensity, said apparatus further comprising means for determining a sign of the offset value so that the offset value has a positive sign when enhancing the color component of each of the pixels of the successive images of the video data and so that the offset value has a negative sign when degrading the color component of each of the pixels of the successive images of the video data.

25. The apparatus as claimed in claim 21, wherein the color component is coded as a digital representation having a central value that represents a minimum intensity and upper and lower extreme values that represent maximum intensity of different chrominance coordinates, said apparatus further comprising means for determining whether the color component is greater than or less than the central value, and means for determining a sign of the offset value so that the offset value has a positive sign when the color component is less than the central value and so that the offset value has a negative sign when the color component is greater than the central value.

* * * * *